United States Patent
Baek

(10) Patent No.: US 9,363,433 B2
(45) Date of Patent: Jun. 7, 2016

(54) ELECTRONIC DEVICE AND METHOD FOR PROCESSING IMAGE

(71) Applicant: Samsung Electronics Co., Ltd., Gyeonggi-do (KR)

(72) Inventor: Woo-Hyun Baek, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/210,170

(22) Filed: Mar. 13, 2014

(65) Prior Publication Data

US 2014/0267816 A1 Sep. 18, 2014

Related U.S. Application Data

(60) Provisional application No. 61/780,619, filed on Mar. 13, 2013.

(30) Foreign Application Priority Data

Nov. 18, 2013 (KR) .................. 10-2013-0139907

(51) Int. Cl.
*H04N 5/76* (2006.01)
*H04N 5/225* (2006.01)
*H04N 5/232* (2006.01)

(52) U.S. Cl.
CPC ......... *H04N 5/23229* (2013.01); *H04N 5/2258* (2013.01); *H04N 5/23293* (2013.01)

(58) Field of Classification Search
CPC . H04N 1/2129; H04N 1/2133; H04N 1/2112; H04N 5/3415; H04N 5/23238
USPC ............ 348/218.1, 239, 231.99, 231.2–231.5
See application file for complete search history.

(56) References Cited

U.S. PATENT DOCUMENTS 7,782,363 B2 * 8/2010 Ortiz ................... H04N 5/232
348/157
2004/0017486 A1 1/2004 Cooper et al.
(Continued)

FOREIGN PATENT DOCUMENTS

EP 2343845 A2 7/2011
JP 2007-028689 A 2/2007
(Continued)

OTHER PUBLICATIONS

European Search Report dated Jun. 24, 2014 in connection with European Application No. 14159336.8, 10 pages.
(Continued)

*Primary Examiner* — Kelly L Jerabek

(57) ABSTRACT

An electronic device includes a first image sensor generating first image data, a second image sensor generating second image data, at least one processor processing the first image data and the second image data, and a display displaying at least one image of the first image data and the second image data processed by the at least one processor, wherein the electronic device is configured to set each time stamp on the first image data and the second image data and the display is configured to display at least one image data on the basis of the time stamps. An operating method of an electronic device includes generating first image data and second image data by using a first image sensor and a second image sensor, respectively, and displaying at least one image data on a display on the basis of the time stamp.

16 Claims, 13 Drawing Sheets

(56) References Cited

U.S. PATENT DOCUMENTS

| | | |
|---|---|---|
| 2004/0187044 A1 | 9/2004 | Barman et al. |
| 2006/0001744 A1 | 1/2006 | Singh |
| 2006/0187227 A1 | 8/2006 | Jung et al. |
| 2006/0224993 A1 | 10/2006 | Wong et al. |
| 2007/0109411 A1 | 5/2007 | Jung et al. |
| 2008/0309774 A1* | 12/2008 | Beng Goh et al. ......... 348/218.1 |
| 2009/0185039 A1 | 7/2009 | Hatanaka |
| 2009/0189999 A1 | 7/2009 | Noh |
| 2011/0000185 A1 | 1/2011 | Gochnour |
| 2011/0001815 A1 | 1/2011 | Nakano et al. |
| 2011/0164178 A1 | 7/2011 | Hardy et al. |
| 2011/0298948 A1 | 12/2011 | Park et al. |
| 2012/0113295 A1 | 5/2012 | Kitagawa et al. |
| 2012/0120186 A1 | 5/2012 | Diaz et al. |
| 2012/0120256 A1 | 5/2012 | Hwang et al. |
| 2013/0010138 A1 | 1/2013 | Bigioi et al. |
| 2013/0162781 A1* | 6/2013 | Hubner et al. ................. 348/47 |

FOREIGN PATENT DOCUMENTS

| | | |
|---|---|---|
| JP | 2008-152692 A | 7/2008 |
| JP | 2010-021935 A | 1/2010 |
| JP | 2011-013610 A | 1/2011 |
| JP | 2011-217121 | 10/2011 |
| KR | 10-2008-0006902 | 1/2008 |
| KR | 10-2009-0083205 | 8/2009 |
| KR | 10-2013-0018209 | 2/2013 |

OTHER PUBLICATIONS

International Search Report dated Jun. 13, 2014 in connection with International Application No. PCT/KR2014/002079, 3 pages.

Written Opinion of International Searching Authority dated Jun. 13, 2014 in connection with International Application No. PCT/KR2014/002079, 7 pages.

Patent Examination Report No. 1 dated Nov. 11, 2014 in connection with Australian Patent Application No. 2014201517; 3 pages.

Notice of Preliminary Rejection dated Jan. 27, 2015 in connection with Japanese Patent Application No. 2014-048348; 12 pages.

Decision of Rejection, dated Jul. 28, 2015, in connection with Japanese Patent Application No. 2014-048348, 4 pages.

Official Communication and English translation issued for Japanese Patent Application No. JP 2015-021239 dated Dec. 16, 2015, 5 pgs.

* cited by examiner

ELECTRONIC DEVICE AND METHOD FOR PROCESSING IMAGE

PRIORITY

The present application is related to and claims priority under 35 U.S.C. §119 to a provisional application Ser. No. 61/780,619 filed in the United States Patent and Trademark Office on Mar. 13, 2013 and an application No. 10-2013-0139907 filed in the Korean Intellectual Property Office on Nov. 18, 2013, the contents of which are incorporated herein by reference.

TECHNICAL FIELD

Various embodiments of the present disclosure relates generally to a method and an electronic device for processing an image.

BACKGROUND

With the developments of information and communication technology and semiconductor technology, various electronic devices become multimedia devices providing various multimedia services. For example, a portable electronic device may provide various multimedia services such as broadcasting services, wireless Internet service, and music playback service.

An electronic device may provide various services through at least one image obtained from image sensors.

SUMMARY

If including a plurality of image sensors an electronic device may not display images obtained through the plurality of image sensors on a display unit at the same time due to different processing times of the images.

To address the above-discussed deficiencies, it is a primary object to provide a device and method for efficiently processing images obtained through a plurality of image sensors in an electronic device.

Another object of the present disclosure is to provide a device and method for reducing processing delay of images obtained through a plurality of image sensors in an electronic device.

Another object of the present disclosure is to provide a device and method for processing images obtained through a plurality of image sensors in an electronic device by using image processing units disposed inside or outside of a processor.

Another object of the present disclosure is to provide a device and method for converting at least one image obtained through at least one image sensor into an image in a format displayable on a display unit by using at least one image processor disposed outside a processor in an electronic device.

Another object of the present disclosure is to provide a device and method for setting a time stamp for images obtained through a plurality of image sensors in an electronic device.

Another object of the present disclosure is to provide a device and method for selecting a plurality of images for synthesis by using a time stamp set for images obtained through a plurality of image sensors in an electronic device.

Another object of the present disclosure is to provide a device and method for selecting a plurality of images for synthesis by using a time stamp and an image processing delay time set for images obtained through a plurality of image sensors in an electronic device.

According to an aspect of the present disclosure, an electronic device includes a first image sensor generating first image data, a second image sensor generating second image data, at least one processor processing at least one image data of the first image data and the second image data; and a display unit displaying at least one image of the first image data and the second image data processed by the at least one processor, wherein the electronic device sets a time stamp on the first image data and the second image data and the display unit displays at least one image data on the basis of the time stamp.

According to an aspect of the present disclosure, an electronic device includes a first image sensor generating first image data, a second image sensor generating second image data, an application processor processing the first image data, and an image processing processor processing the second image data, wherein the image processing processor converts the second image data into a format displayable on a display unit.

According to an aspect of the present disclosure, an electronic device includes a storage device storing first image data having a first time stamp added and second image data having a second time stamp added, at least one processor processing at least one image data of the first image data and the second image data, and a display unit displaying at least one image of the first image data and the second data processed by the at least one processor, wherein the display unit displays at least one image data on the basis of the time stamp.

According to an aspect of the present disclosure, an electronic device includes a first image sensor generating first image data; a second image sensor generating second image data, at least one processor processing at least one of the first image data and the second image data, and a storage device storing time stamps corresponding to the first image data and the second image data, wherein the electronic device compares time stamps of the image data.

According to an aspect of the present disclosure, an operating method of an electronic device includes generating a plurality of image data by using a plurality of image sensors, setting a time stamp corresponding to each of the plurality of image data, and displaying at least one image data on a display unit on the basis of the time stamp.

According to an aspect of the present disclosure, an operating method of an electronic device includes generating first image data and second image data by using a first image sensor and a second image sensor, and processing the first image data by using an application processor and processing the second image data by using an image processing processor, wherein the processing of the second image data includes converting the second image data into a format displayable on a display unit.

According to an aspect of the present disclosure, an operating method of an electronic device includes storing first image data including a first time stamp added and second image data including a second time stamp added, and displaying at least one image data on a display unit on the basis of the time stamp.

According to an aspect of the present disclosure, an operating method of an electronic device includes generating first image data and second image data by using a first image sensor and a second image sensor, storing a first image data including a first time stamp added and a second image data including a second time stamp added, and displaying at least one image data on a display unit on the basis of the time stamp.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, embodiments of the present disclosure will be described in more detail with reference to the accompanying drawings. In the following description, detailed descriptions of well-known functions or constructions will be omitted since they would obscure the disclosure in unnecessary detail. Also, the terms used herein are defined according to the functions of the present disclosure. Thus, the terms may vary depending on user's or operator's intentions or practices. Therefore, the terms used herein must be understood based on the descriptions made herein.

Various embodiments of the present disclosure describe a device and method for efficiently processing images obtained through a plurality of image sensors in an electronic device.

An electronic device according to an embodiment of the present disclosure may be one or a combination of various devices such as smart phones, tablet PCs, mobile phones, video phones, e-book readers, desktop PCs, laptop PCs, netbook computers, PDAs, PMPs, MP3 players, mobile medical equipment, jewelry, electronics accessory, cameras, wearable devices, electronic watches, wrist watches, refrigerators, air conditioners, vacuum cleaners, artificial intelligence robots, TVs, DVD players, audios, ovens, microwaves, washing machines, microwave bracelets, electronic necklaces, air purifiers, electronic picture frames, medical devices (e.g., MRAs, MRIs, CTs, camcorders, or ultrasound devices), navigation devices, GPS receivers, EDRs, FDRs, set-top boxes, TV boxes (for example, SamSung HomeSync™, Apple TVTM™, or Google TVTM™), Electronic dictionaries, automotive infotainment devices, marine electronic equipment (for example, marine navigation systems and gyro compasses), Avionics, security devices, and electronic garments, electronic keys, camcorders, game consoles, HMDs, flat panel display devices, the electronic albums, part of furniture or buildings/structures including an electronic device, electronic boards, electronic signature input devices or projectors, all of which include a plurality of sensors. It is apparent to those skilled in the art that the electronic device is not limited to the above-mentioned devices.

Figure 1:
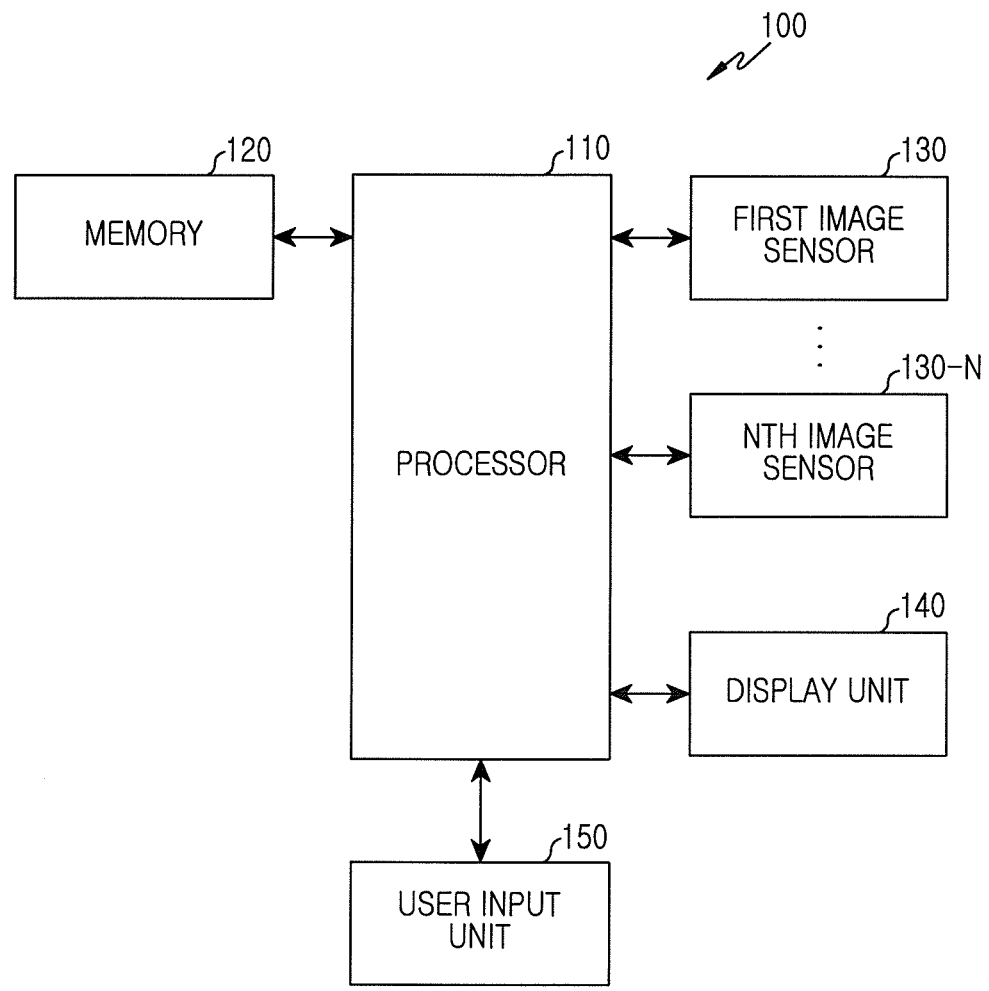
FIG. 1 is a block diagram illustrating a configuration of an electronic device according to various embodiments of the present disclosure.

FIG. 1 is a block diagram illustrating a configuration of an electronic device according to various embodiments of the present disclosure.

Referring to FIG. 1, the electronic device 100 includes a processor 110, a memory 120, image sensors 130-1 to 130-N, a display unit 140, and a user input unit 150. Here, the processor 110 can include an application program processor AP.

The processor 110 can control the electronic device 100 so that it can provide various services.

The processor 110 interprets a command received from at least another component (for example, the memory 120, the image sensors 130-1 to 130-N, the display unit 140, and the user input unit 150) included in the electronic device 100 and then and performs operations and data processing in response to the interpreted command. For example, the processor 110 can perform at least one image processing on images provided from the image sensors 130-1 to 130-N, for example, level adjustment, noise reduction, gamma correction, and format conversion for displaying an image on the display unit 140. The processor 110 can store the processed images in the memory 120 or display them on the display unit 140. At this point, the processor 110 can transmit the images displayed on the display unit 140 to the memory 120 so as to temporarily store them in the memory 120. Here, the image processing, that is, the format conversion for displaying an image on the display unit 140, can include color space conversion.

The processor 110 can allow the electronic device 100 to provide various multimedia services by executing at least one program stored in the memory 120. The processor 110 can select at least two from among images obtained through the image sensors 130-1 to 130-N and synthesize them by executing a program stored in the memory 120. For example, the processor 110 can set a time stamp corresponding to images obtained through at least one among the image sensors 130-1 to 130-N. As another example, if a capture event occurs, the processor 110 can select and synthesize at least two images for synthesis on the basis of a time stamp of images obtained through each of the image sensors 130-1 to 130-N. As another example, if a capture event occurs, the processor 110 can select and synthesize at least two images for synthesis on the basis of a processing delay time and a time stamp for images obtained through each of the image sensors 130-1 to 130-N.

The memory 120 can store commands or data received or generated from at least one component included in the electronic device 100. For example, the memory 120 can include programming modules, for example, a kernel, a middleware, an application programming interface (API), and an application. Here, the programming module can include an operating system (OS) controlling resources relating to the electronic device 100 or various applications running on OS. At this point, each programming module can be configured with software, firmware, hardware, or a combination thereof. The OS can include Android, iOS, Windows, Symbian, Tizen, or bada.

The image sensors 130-1 to 130-N can provide collected images obtained through capturing a subject to the processor 110. At this point, the image sensors 130-1 to 130-N can transmit an image to the processor 110 through a serial interface such as MIPI and MDDI or a parallel interface such as parallel bus. Here, the first image sensor 130-1 can be disposed at the front of the electronic device 100 and the Nth image sensor 130-N can be disposed at the rear of the electronic device 100.

The display unit 140 can provide a graphic user interface such as state information, characters entered by a user, a moving image, or a still image of the electronic device 100. For example, the display unit 140 can display at least one image provided from the processor 110. As another example, the display unit 140 can display at least two images selected by the processor 110 based on a time stamp or a time stamp and an image processing delay time.

The user input unit 150 can transmit commands or data generated by a user selection to the processor 120 or the memory 120. For example, the user input unit 150 can include a touch input unit, a pen sensor, a key, or an ultrasonic input device.

Although not shown in the drawings, the electronic device 100 can further include a communication unit for communicating with another electronic device or a server through voice communication or data communication. Here, the communication unit can include a plurality of communication sub modules supporting different communication networks. For example, the communication network is not limited thereto but can support a short range communication protocol (for example, Wifi, BT, NFC) or a network communication (for example, Internet, LAN, WAN, telecommunication network, cellular network, satellite network, or POTS).

According to the above-mentioned embodiment, the electronic device 100 includes the image sensors 130-1 to 130-N. At this point, at least one image sensor among the image sensors 130-1 to 130-N can be selectively mounted on the electronic device 100. For example, at least one image sensor among the image sensors 130-1 to 130-N can be selectively mounted on the electronic device 100 through a wired interface. As another example, at least one image sensor among the image sensors 130-1 to 130-N can be selectively connected to the electronic device 100 through a wireless interface such as Bluetooth and wireless LAN.

Figure 2:
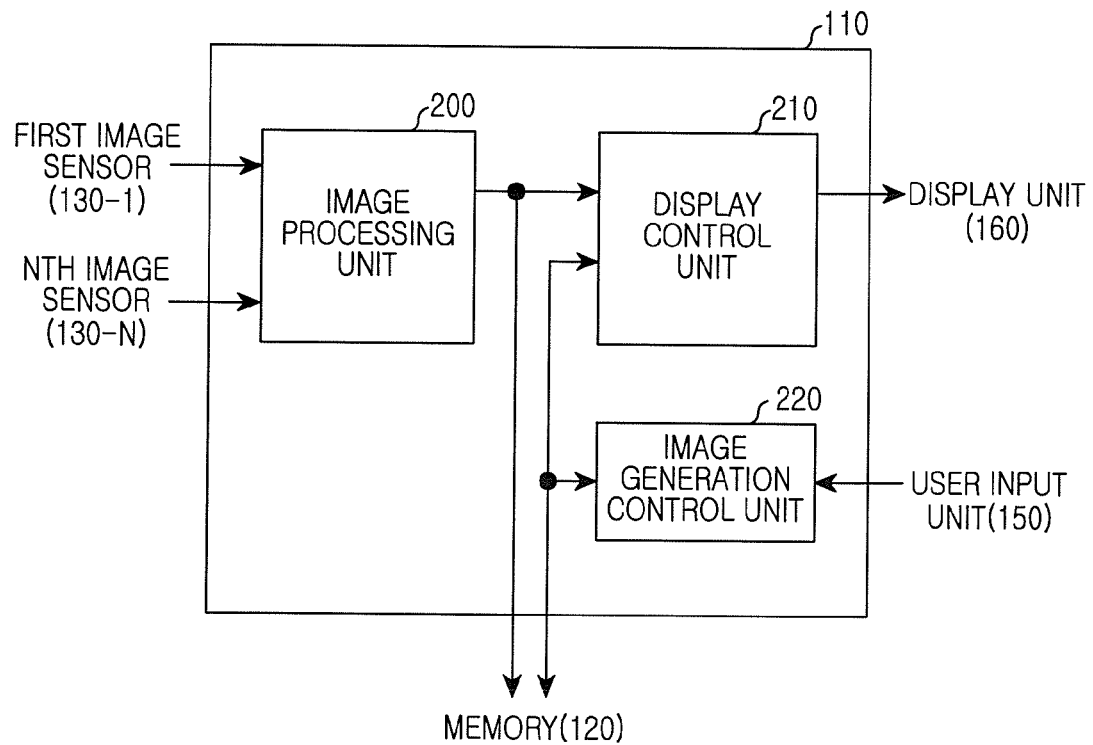
FIG. 2 is a block diagram illustrating a configuration of a processor according to various embodiments of the present disclosure.

FIG. 2 is a block diagram illustrating a configuration of a processor according to various embodiments of the present disclosure.

Referring to FIG. 2, the processor 110 includes an image processing unit 200, a display control unit 210, and an image generation control unit 220.

The image processing unit 200 can perform at least one image processing on image data provided from each of the image sensors 130-1 to 130-N, for example, level adjustment, noise reduction, gamma correction, and color space conversion. The image processing unit 200 can transmit the processed image to at least one of the memory 120 and the display control unit 210. At this point, the image processing unit 200 can transmit the images displayed on the display unit 140 to the memory 120 so as to temporarily store them in the memory 120.

The display control unit 210 can provide a graphic user interface through the display unit 140. For example, the display control unit 210 can display images provided from the image processing unit 200 or the memory 120 on the display unit 140. At this point, the display control unit 210 can display images provided from the image sensors 130-1 to 130-N through the image processing unit 200 on the display unit 140 simultaneously.

The image generation control unit 220 can select at least two images from among images obtained through the image sensors 130-1 to 130-N and synthesize them. For example, if a capture event occurs, the image generation control unit 220 can select and synthesize at least two images for synthesis on the basis of a time stamp of images stored in the memory 120. For example, if different sizes of images obtained through the low-pixel first image sensor 130-1 and the high-pixel Nth image sensor 130-N are synthesized, the image generation control unit 220 can select at least one first image including a time stamp prior to a capture event occurrence time from among images obtained through the first image sensor 130-1. At this point, the image generation control unit 220 can select at least one first image from among images including a time stamp prior to a capture event occurrence time by using a processing delay difference on an image of the first image sensor 130-1 and an image of the Nth image sensor 130-N. The image generation control unit 220 can select at least one second image obtained at a time closest to the capture event occurrence time according to the time stamp of images obtained through the Nth image sensor 130-N and then can synthesize the second image with the first image. At this point, the image generation control unit 220 can transmit first and second images stored in the memory 120 to the control unit 210 so as to display a synthesized image on the display unit 140.

Although not shown in the drawings, the processor 110 can further include a time setting unit for setting a time stamp for at least one image data provided from the image sensors 130-1 to 130-N. For example, the time setting unit can record a time corresponding to each image data provided from the image sensors 130-1 to 130-N by each frame unit. As another example, if there is at least one image sensor that is selectively mounted on the electronic device 100 among the image sensors 130-1 to 130-N, the time setting unit can set a time stamp on at least one image data provided from the at least one image sensor mounted on the electronic device 100. At this point, an image obtained through at least one image sensor that is selectively mounted on the electronic device 100 can be set with a time stamp by an additional module included in each image sensor.

According to the above-mentioned embodiment, the processor 110 can process images provided from the image sensors 130-1 to 130-N through the image processing unit 200.

According to another embodiment, the processor 110 can process images provided from the image sensors 130-1 to 130-N through a plurality of image processing units in the processor 110.

Figure 3:
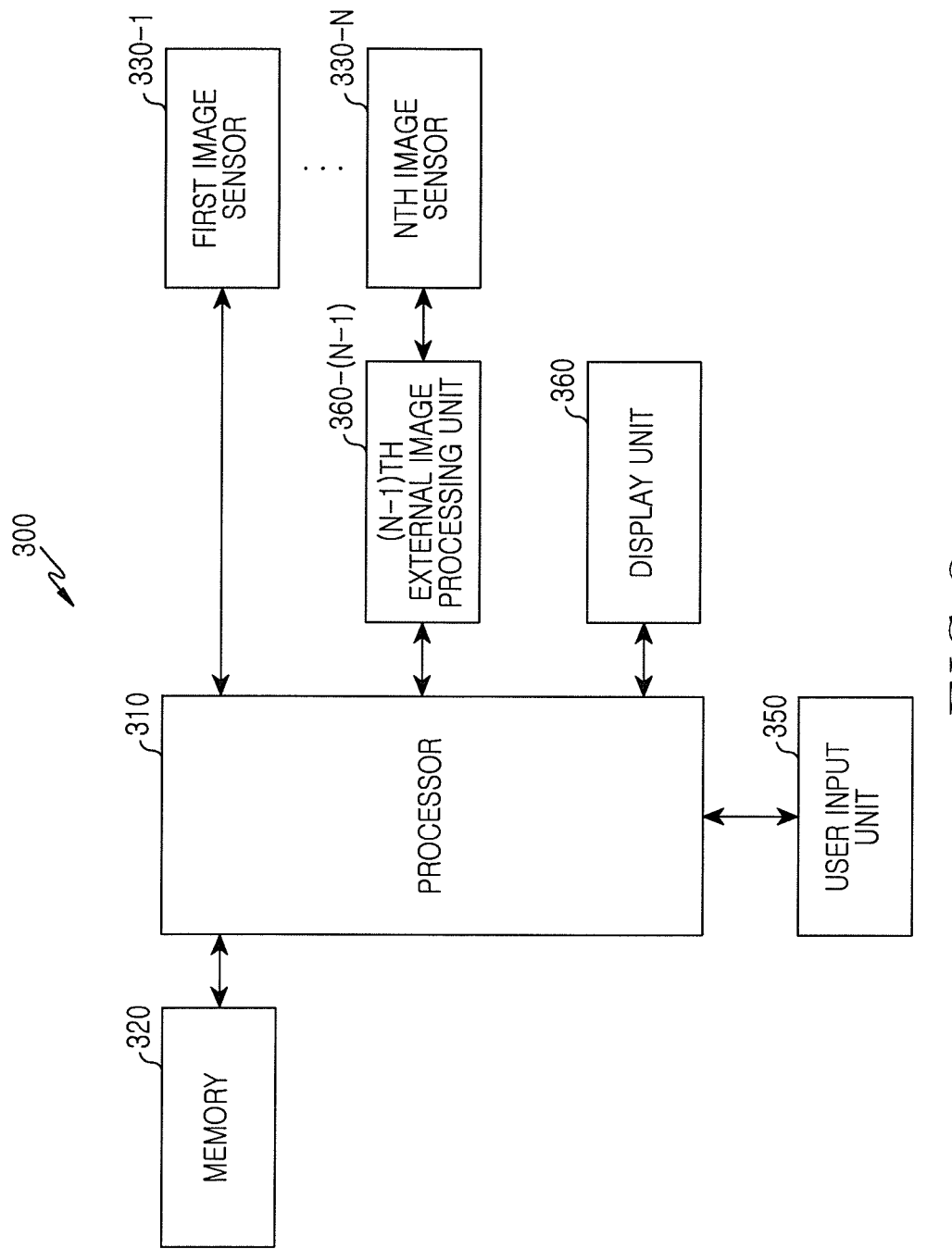
FIG. 3 is a block diagram illustrating a configuration of an electronic device according to various embodiments of the present disclosure.

FIG. 3 is a block diagram illustrating a configuration of an electronic device according to various embodiments of the present disclosure.

Referring to FIG. 3, the electronic device 300 includes a processor 310, a memory 320, image sensors 330-1 to 330-N, external image processing units 340-1 to 340-(N-1), a user input unit 350, and a display unit 360. Here, the processor 310 can include an application program processor AP.

The processor 310 can control the electronic device 300 so that it can provide various services.

The processor 310 interprets a command received from at least another component (for example, the memory 320, the first image sensor 330-1, the external image processing units 340-1 to 340-(N-1), the user input unit 350, and the display unit 360) included in the electronic device 300 and then performs operations and data processing in response to the interpreted command. For example, the processor 310 can perform at least one image processing on images provided from the first image sensor 330-1, for example, level adjustment, noise reduction, gamma correction, and format conversion for displaying an image on the display unit 360. The processor 310 can store the processed images in the memory 320 or display them on the display unit 360. At this point, the processor 310 can transmit the images displayed on the display unit 360 to the memory 320 so as to temporarily store them in the memory 320. As another example, the processor 310 can convert images stored in the memory 320 into images in a format for displaying the images on the display unit 560 through the external image processing units 340-1 to 340-(N-1) and then display the converted images on the display unit 360. Here, the image processing, that is, the format conversion for displaying an image on the display unit 360, can include color space conversion.

The processor 310 can allow the electronic device 300 to provide various multimedia services by executing at least one program stored in the memory 320. The processor 310 can select at least two images from among images obtained through the image sensors 330-1 to 330-N and synthesize them by executing a program stored in the memory 320. For example, the processor 310 can set a time stamp on image data provided from the first image sensor 330-1 or the first image sensor 330-1 and the external image processing units 340-1 to 340-(N-1). As another example, if a capture event occurs, the processor 310 can select and synthesize at least two images for synthesis on the basis of a time stamp of images obtained through each of the image sensors 330-1 to 330-N. As another example, if a capture event occurs, the processor 310 can select and synthesize at least two images for synthesis on the basis of a processing delay time and a time stamp for images obtained through each of the image sensors 330-1 to 330-N.

The memory 320 can store commands or data received or generated from at least one component included in the electronic device 300.

The image sensors 330-1 to 330-N can provide collected images obtained through capturing a subject to the processor 310. At this point, the image sensors 330-1 to 330-N can transmit an image to the processor 310 or the external image processing units 340-1 to 340-(N-1) through a serial interface such as MIPI and MDDI or a parallel interface such as parallel bus. Here, the first image sensor 330-1 can be disposed at the front of the electronic device 300 and the Nth image sensor 330-N can be disposed at the rear of the electronic device 300.

The external image processing units 340-1 to 340-(N-1) can perform image processing on an image provided from the image sensors 330-2 to 330-N, for example, level adjustment, noise reduction, and gamma correction.

The user input unit 350 can transmit commands or data generated by a user selection to the processor 310 or the memory 320. For example, the user input unit 350 can include a touch input unit, a pen sensor, a key, or an ultrasonic input device.

The display unit 360 can provide a graphic user interface such as state information, characters entered by a user, a moving image, or a still image of the electronic device 300. For example, the display unit 360 can display at least one image provided from the processor 310. As another example, the display unit 360 can display at least two images selected by the processor 310 based on a time stamp or a time stamp and an image processing delay time.

Although not shown in the drawings, the electronic device 300 can further include a communication unit for communicating with another electronic device or a server through voice communication or data communication. Here, the communication unit can include a plurality of communication sub modules supporting different communication networks.

According to the above-mentioned embodiment, the electronic device 300 includes the image sensors 330-1 to 330-N. At this point, at least one image sensor among the image sensors 330-1 to 330-N can be selectively mounted on the electronic device 300. For example, at least one image sensor among the image sensors 330-1 to 330-N can be selectively mounted on the electronic device 300 through a wired interface. In this case, an external image processing unit connected to at least one image sensor that is selectively mounted on the electronic device 300 can be mounted on the electronic device 300 or can be selectively mounted on the electronic device 300 in addition to an Nth image sensor.

As another example, at least one image sensor among the image sensors 330-1 to 330-N can be selectively connected to the electronic device 300 through a wireless interface such as Bluetooth and wireless LAN. In this case, an external image processing unit connected to at least one image sensor that is selectively connected to the electronic device 300 can be mounted on the electronic device 300 or can be selectively mounted on the electronic device 300 in addition to an Nth image sensor.

Figure 4:
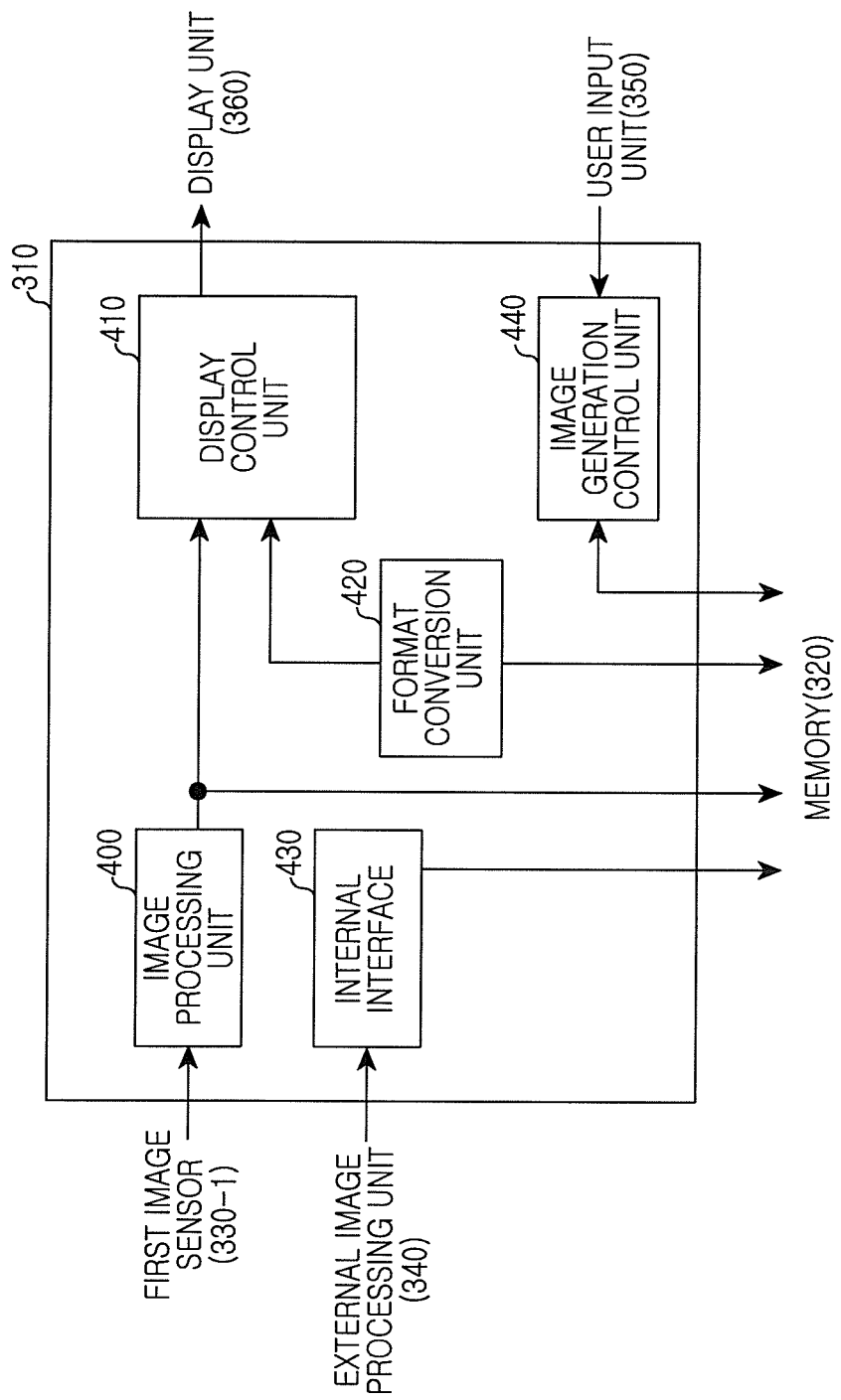
FIG. 4 is a block diagram illustrating a configuration of a processor according to various embodiments of the present disclosure.

FIG. 4 is a block diagram illustrating a configuration of a processor according to various embodiments of the present disclosure.

Referring to FIG. 4, the processor 310 includes an image processing unit 400, an internal interface 410, a display control unit 420, a format conversion unit 430, and an image generation control unit 440.

The image processing unit 400 can perform at least one image processing on image data provided from the first image sensor 130-1, for example, level adjustment, noise reduction, gamma correction, and color space conversion. The image processing unit 400 can transmit the processed image to at least one of the memory 320 and the display control unit 420. At this point, the image processing unit 400 can transmit the images displayed on the display unit 360 to the memory 320 so as to temporarily store them in the memory 320.

The internal interface 410 can transmit images provided from each of the external image processing units 340-1 to 340-(N−1) to the memory 320. For example, the internal interface 410 can include at least one of MIFI and CAMIF.

The display control unit 420 can provide a graphic user interface through the display unit 360. For example, the display control unit 420 can display images provided from the image processing unit 400 or the memory 320 on the display unit 360. At this point, the display control unit 420 can display an image provided from the first image sensor 330-1 through the image processing unit 400 and an image provided from the Nth image sensor 330-N through the memory 320 on the display unit 360 simultaneously. For example, the display control unit 420 can display an image converted into a data format for displaying the image on the display unit 360 through the format conversion unit 430 and an image provided from the first image sensor 330-1 through the image processing unit 400 simultaneously.

The format conversion unit 430 can convert an image provided from the memory 320 into a data format displayable on the display unit 360. For example, the format conversion unit 430 can perform color space conversion on an image provided from the memory 320 and transmit the converted image to the display control unit 420.

The image generation control unit 440 can select at least two images from among images obtained through the image sensors 330-1 to 330-N and synthesize them. For example, if a capture event occurs, the image generation control unit 440 can select and synthesize at least two images for synthesis on the basis of a time stamp of images stored in the memory 320. If different sizes of images obtained through the low-pixel first image sensor 330-1 and the high-pixel Nth image sensor 330-N are synthesized, the image generation control unit 440 can select at least one first image including a time stamp prior to a capture event occurrence time from among images obtained through the first image sensor 330-1. At this point, the image generation control unit 440 can select at least one first image from among images including a time stamp prior to a capture event occurrence time by using a processing delay difference on an image of the first image sensor 330-1 and an image of the Nth image sensor 330-N. The image generation control unit 440 can select at least one second image obtained at a time closest to the capture event occurrence time according to the time stamp of images obtained through the Nth image sensor 330-N and then can synthesize the second image with the first image. At this point, the image generation control unit 440 can transmit first and second images stored in the memory 320 to the control unit 420 so as to display a synthesized image on the display unit 360.

Although not shown in the drawings, the processor 310 can further include a time setting unit for setting a time stamp on image data provided from the first image sensor 330-1 or the first image sensor 330-1 and the external image processing units 340-1 to 340-(N−1). For example, the time setting unit can record a time corresponding to each image data provided from the first image sensor 330-1 by each frame unit. At this point, an image obtained through the second image sensor 330-2 to the Nth image sensor 330-N can be set with a time stamp through an external image processing unit connected to each image sensor.

Figure 5:
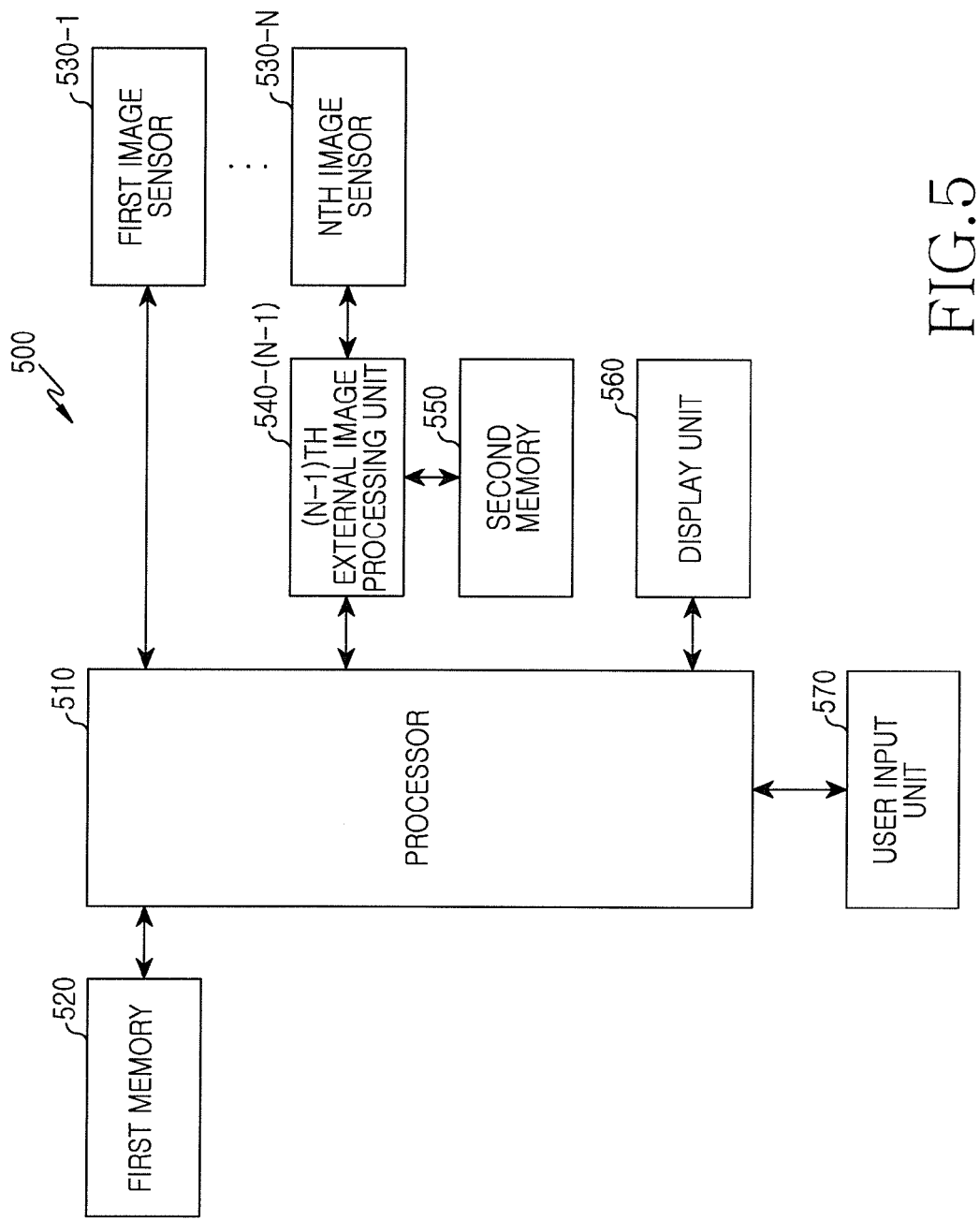
FIG. 5 is a block diagram illustrating a configuration of an electronic device according to various embodiments of the present disclosure.

FIG. 5 is a block diagram illustrating a configuration of an electronic device according to various embodiments of the present disclosure.

Referring to FIG. 5, the electronic device 500 includes a processor 510, memories 520 and 550, image sensors 530-1 to 530-N, external image processing units 540-1 to 540-(N−1), a display unit 560, and a user input unit 570. Here, the processor 510 can include an application program processor AP.

The processor 510 can control the electronic device 500 so that it can provide various services.

The processor 510 can interpret a command received from at least another component included in the electronic device 500 and performs operations or data processing in response to the interpreted command. For example, the processor 510 can perform at least one image processing on images provided from the first image sensor 530-1, for example, level adjustment, noise reduction, gamma correction, and format conversion for displaying an image on the display unit 560. The processor 510 can store the processed images in the first memory 520 or display them on the display unit 560. At this point, the processor 510 can transmit the images displayed on the display unit 560 to the first memory 520 so as to temporarily store them in the first memory 520. As another example, the processor 510 can convert images stored in the first memory 520 into images in a format for displaying the images on the display unit 560 through the external image processing units 540-1 to 540-(N−1) and then display the converted images on the display unit 560. Here, the image processing, that is, the format conversion for displaying an image on the display unit 560, can include color space conversion.

The processor 510 can allow the electronic device 500 to provide various multimedia services by executing at least one program stored in the first memory 520. The processor 510 can select at least two images from among images obtained through the image sensors 530-1 to 530-N and synthesize them by executing a program stored in the memory 520. For example, the processor 510 can set a time stamp on image data provided from the first image sensor 530-1 or the first image sensor 530-1 and the external image processing units 540-1 to 540-(N−1). As another example, if a capture event occurs, the processor 510 can select and synthesize at least two images for synthesis on the basis of a time stamp of images obtained through each of the image sensors 530-1 to 530-N. As another example, if a capture event occurs, the processor 510 can select and synthesize at least two images for synthesis on the basis of a processing delay time and a time stamp for images obtained through each of the image sensors 530-1 and 530-N.

The first memory 520 can store commands or data received or generated from at least one component included in the electronic device 500.

The image sensors 530-1 to 530-N can provide collected images obtained through capturing a subject to the processor 510. At this point, the image sensors 530-1 to 530-N can transmit an image to the processor 510 or the external image processing units 540-1 to 540-(N−1) through a serial interface such as MIPI and MDDI or a parallel interface such as parallel bus. Here, the first image sensor 530-1 can be disposed at the front of the electronic device 500 and the Nth image sensor 530-N can be disposed at the rear of the electronic device 500.

The external image processing units 540-1 to 540-(N−1) can perform image processing on an image provided from the image sensors 530-2 to 530-N, for example, level adjustment, noise reduction, gamma correction, and color space conversion, and store the processed image in the first memory 520. Additionally, the external image processing units 540-1 to 540-(N−1) can set time information in an image provided from the image sensors 530-2 to 530-N and store the image in the second memory 550.

The second memory 550 can store an unprocessed image provided from the external image processing units 540-1 to 540-(N−1). For example, the second memory 550 can store raw image data provided from the external image processing units 540-1 to 540-(N−1). At this point, the second memory 550 can exist at each of the external image processing units 540-1 and 540-(N−1).

The display unit 560 can provide a graphic user interface such as state information, characters entered by a user, a moving image, or a still image of the electronic device 500. For example, the display unit 560 can display at least one image provided from the processor 510. As another example, the display unit 560 can display at least two images selected by the processor 510 based on a time stamp or a time stamp and an image processing delay time.

The user input unit 570 can transmit commands or data generated by a user selection to the processor 510 or the first memory 520. For example, the user input unit 570 can include a touch input unit, a pen sensor, a key, or an ultrasonic input device.

Although not shown in the drawings, the electronic device 500 can further include a communication unit for communicating with another electronic device or a server through voice communication or data communication. Here, the communication unit can include a plurality of communication sub modules supporting different communication networks.

According to the above-mentioned embodiment, the electronic device 500 includes the image sensors 530-1 to 530-N. At this point, at least one image sensor among the image sensors 530-1 to 530-N can be selectively mounted on the electronic device 500. For example, at least one image sensor among the image sensors 530-1 to 530-N can be selectively mounted on the electronic device 500 through a wired interface. In this case, an external image processing unit connected to at least one image sensor that is selectively mounted on the electronic device 300 can be mounted on the electronic device 500 or can be selectively mounted on the electronic device 300 in addition to an Nth image sensor.

As another example, at least one image sensor among the image sensors 530-1 to 530-N can be selectively connected to the electronic device 500 through a wireless interface such as Bluetooth and wireless LAN. In this case, an external image processing unit connected to at least one image sensor that is selectively connected to the electronic device 500 can be mounted on the electronic device 500 or can be selectively connected to the electronic device 300 in addition to an Nth image sensor.

Figure 6:
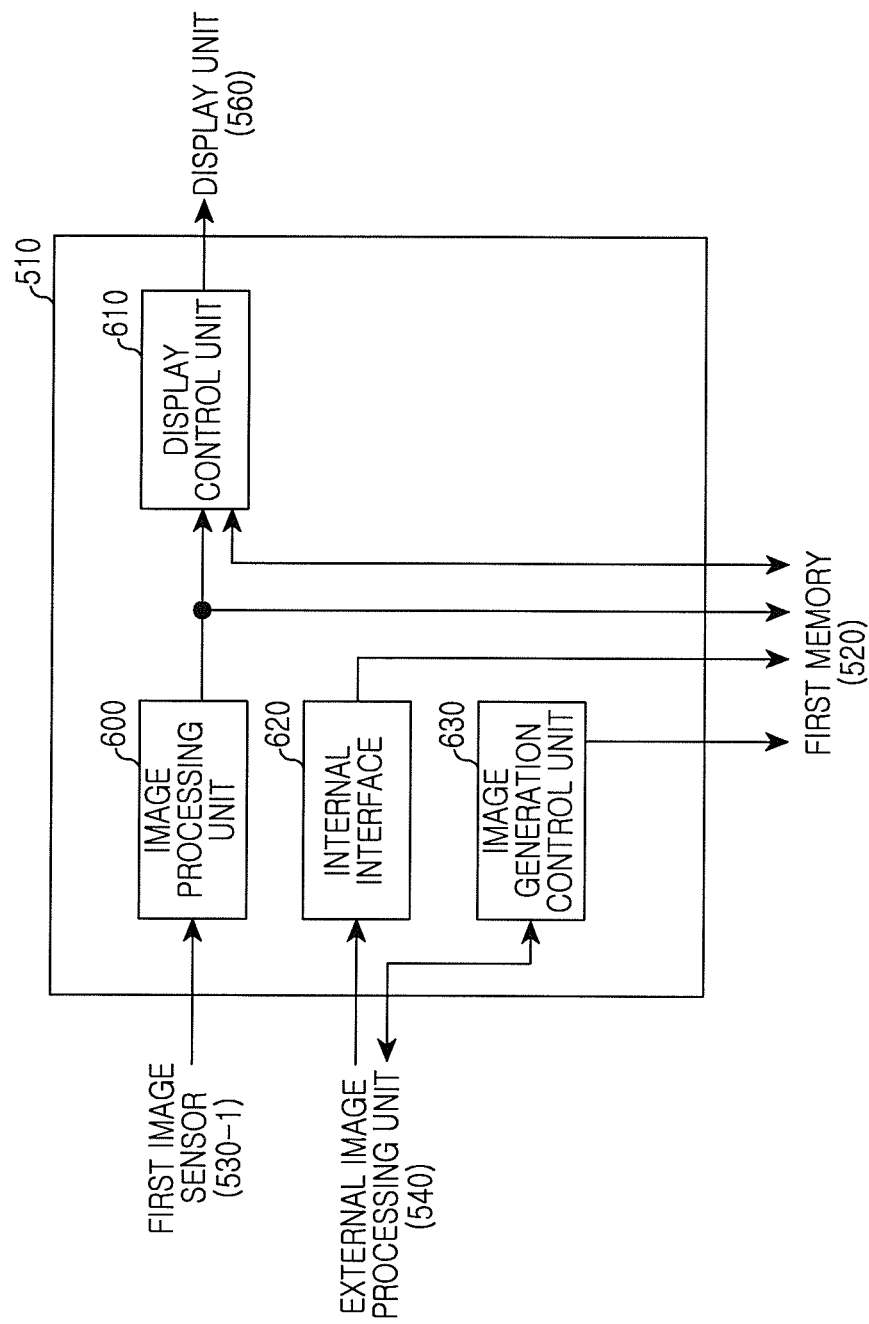
FIG. 6 is a block diagram illustrating a configuration of a processor according to various embodiments of the present disclosure.

FIG. 6 is a block diagram illustrating a configuration of a processor according to various embodiments of the present disclosure.

Referring to FIG. 6, the processor 510 includes an image processing unit 600, an internal interface 610, a display control unit 620, and an image generation control unit 630.

The image processing unit 600 can perform at least one image processing on image data provided from the first image sensor 530-1, for example, level adjustment, noise reduction, gamma correction, and color space conversion. The image processing unit 600 can transmit the processed image to at least one of the first memory 520 and the display control unit 620. At this point, the image processing unit 600 can transmit the images displayed on the display unit 560 to the first memory 520 so as to temporarily store them in the first memory 520.

The internal interface 610 can transmit images provided from each of the external image processing units 540-1 to 540-(N−1) to the first memory 520. For example, the internal interface 610 can include at least one of MIFI and CAMIF and a raw data dumping interface (RDI) for transmitting an image converted for displaying an image on the display unit 560 from the external image processing units 540-1 to 540-(N−1).

The display control unit 620 can provide a graphic user interface through the display unit 560. For example, the display control unit 620 can display images provided from the image processing unit 600 or the first memory 520 on the display unit 560. At this point, the display control unit 620 can display an image provided from the first image sensor 630-1 through the image processing unit 600 and an image provided from the Nth image sensor 530-N through the first memory 520 on the display unit 560 simultaneously.

The image generation control unit 630 can select at least two images from among images obtained through the image sensors 530-1 to 530-N and synthesize them. For example, if a capture event occurs, the image generation control unit 630 can select and synthesize at least two images for synthesis on the basis of a time stamp of images stored in the first memory 520 and the second memory 550. If images obtained through the low-pixel first image sensor 530-1 and the high-pixel Nth image sensor 530-N are synthesized, the image generation control unit 630 can select at least one first image including a time stamp prior to a capture event occurrence time from among images stored in the first memory 520 and obtained through the first image sensor 530-1. At this point, the image generation control unit 630 can select at least one first image from among images including a time stamp prior to a capture event occurrence time by using a processing delay difference on an image of the first image sensor 530-1 and an image of the Nth image sensor 530-N. The image generation control unit 630 can select a second image obtained at a time closest to the capture event occurrence time according to the time stamp of images stored in the second memory 550 and obtained through the Nth image sensor 530-N and then can synthesize the second image with the first image. As another embodiment, if images obtained through the low-pixel first image sensor 530-1 and the high-pixel Nth image sensor 530-N are synthesized, the image generation control unit 630 can select at least one second image obtained at a time closest to a capture event occurrence time according to a time stamp of images stored in the second memory 550 and obtained through the Nth image sensor 530-N. The second image stored in the second memory 550 selected from the image generation control unit 630 can be stored in the first memory 520 through the processor 510. The image generation control unit 630 can select a first image obtained at a time closest to a time at which the second image starts to be transmitted to the processor 510 or at a time closest to a time at which the second image starts to be stored in the first memory 520 according to the time stamp of images stored in the first memory 520 and obtained through the first image sensor 530-1, and then can synthesize the selected first image with the second image. At this point, the image generation control unit 630 can transmit first and second images stored in the first memory 520 to the control unit 620 so as to display a synthesized image on the display unit 560.

Although not shown in the drawings, the processor 510 can further include a time setting unit for setting a time stamp on image data provided from the first image sensor 530-1 or the first image sensor 530-1 and the external image processing units 540-1 to 540-(N−1). For example, the time setting unit can record a time corresponding to each image data provided from the first image sensor 530-1 by each frame unit. At this point, an image obtained through the second image sensor 530-2 to the Nth image sensor 530-N can be set with a time stamp through an external image processing unit connected to each image sensor. As another example, the time setting unit can record a time corresponding to image data provided from the external image sensor 540-(N−1) by each frame unit. For example, the image generation control unit 630 can select and synthesize at least two images for synthesis on the basis of a time stamp of images stored in the first memory 520.

Figure 7:
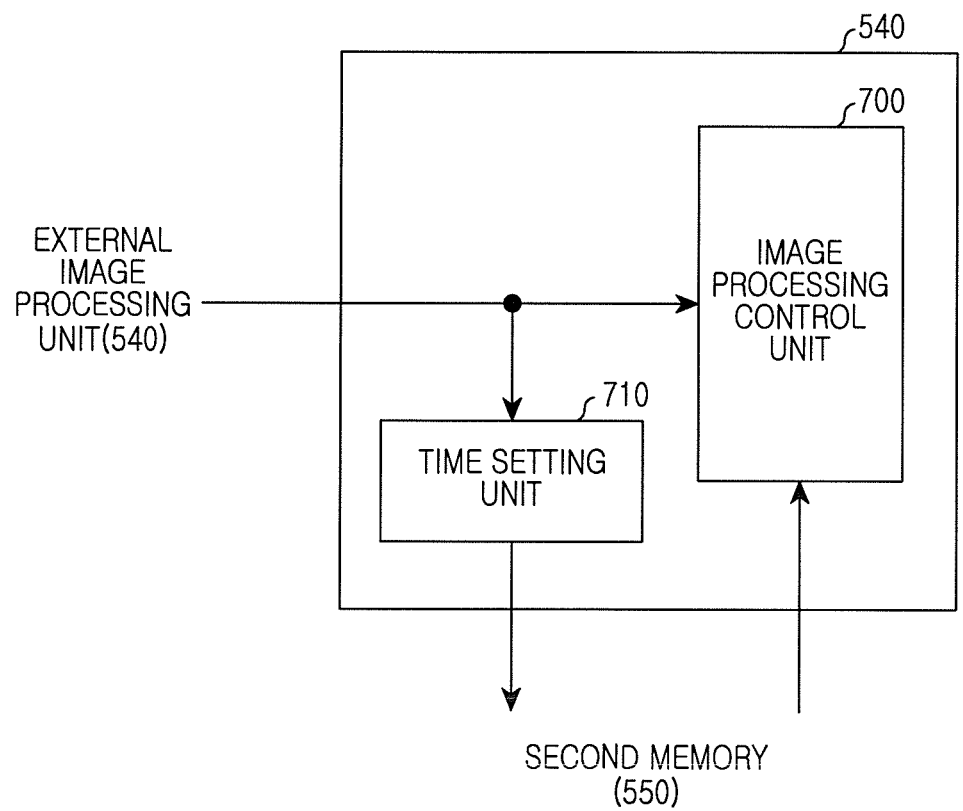
FIG. 7 is a block diagram illustrating a configuration of an external image processing unit according to various embodiments of the present disclosure.

FIG. 7 is a block diagram illustrating a configuration of an external image processing unit according to various embodiments of the present disclosure.

Referring to FIG. 7, the external image processing unit 540 includes an image processing control unit 700 and a time setting unit 710.

The image processing control unit 700 can perform at least one image processing on image data provided from the image sensors 530-2 to 530-N, for example, level adjustment, noise reduction, gamma correction, and format conversion for displaying an image on the display unit 560. For example, the image processing control unit 700 can convert image data of YUV422 provided from the image sensors 530-2 to 530-N into image data of YUV420 through color space conversion, so as to convert an image into a format displayable on the display unit 560.

The image processing control unit 700 can convert at least one image data stored in the second memory 550 into a format displayable on the display unit 560 and then can transmit the converted image into the image generation control unit 630. For example, the image processing control unit 700 can receive selected image data for image synthesis from the second memory 550 according to a control of the image generation control unit 630 of FIG. 6 and then can convert the received image data into a format displayable on the display unit 560 to transmit it to the image generation control unit 630. As another example, when a capture event occurs, the image processing control unit 700 can convert at least one image data among images stored in the second memory 550 into a format displayable on the display unit 560 and then can transmit the converted image data into the image generation control unit 630.

The time setting unit 710 can set a time stamp in image data provided from the image sensors 530-2 to 530-N. For example, the time setting unit can include a time insertion unit and a frame setting unit and can record a time corresponding to each image data provided from the image sensors 530-2 to 530-N by each frame unit.

According to the above-mentioned embodiment, the external image processing unit can include an image processing control unit 700 and a time setting unit 710. According to another embodiment, the time setting unit 710 can be disposed outside an external image processing unit.

Figure 8:
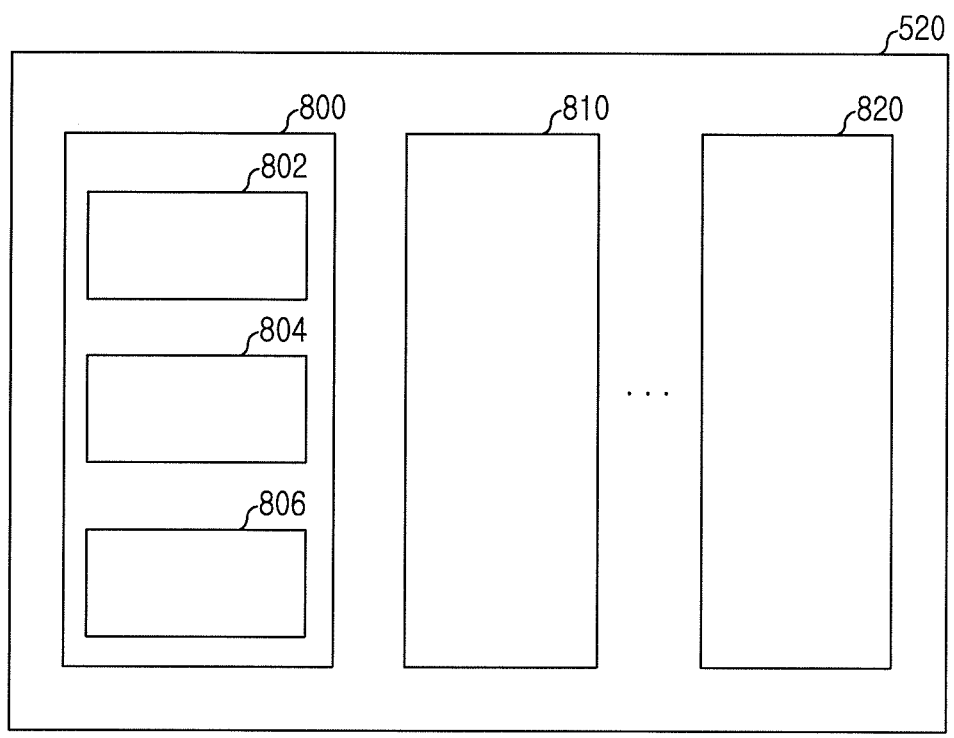
FIG. 8 is a block diagram illustrating a configuration of a memory according to various embodiments of the present disclosure.

FIG. 8 is a block diagram illustrating a configuration of a memory according to various embodiments of the present disclosure.

Referring to FIG. 8, the first memory 520 includes a plurality of blocks 800, 810, and 820 logically or physically and stores data therein. For example, image data provided from the image processing unit 600 of the processor 510 can be stored in the third block 820 of the first memory 520.

Image data provided from the external image processing units 540-1 to 540-(N−1) in the first block 800 of the first memory 520. At this point, the image data can be classified into Y data, UV data, and metadata and can be stored in the internal blocks 802, 804, and 806 of the first block 800. Here, the metadata can include at least one of a frame identifier of image data, a time stamp, focus information, and image setting information EXIF.

If a capture event occurs, image data stored in the second memory 550 can be stored in the third block 820 of the first memory 520 through the external image processing units 540-1 to 540-(N−1).

As mentioned above, the electronic device 500 can convert images obtained through the image sensor 530-N into a format for displaying the images on the display unit 560 through the external image processing unit 540-(N−1) and then can store the converted images in the first memory 520, so that delay due to an additional format conversion can be reduced.

Figure 9:
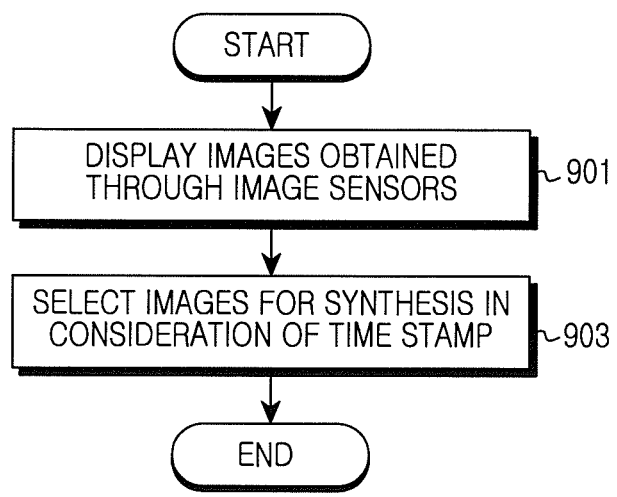
FIG. 9 is a flowchart illustrating a method of selecting images for synthesis in an electronic device according to various embodiments of the present disclosure.

FIG. 9 is a flowchart illustrating a method of selecting images for synthesis in an electronic device according to various embodiments of the present disclosure.

Referring to FIG. 9, the electronic device can display images obtained through a plurality of image sensors on a display unit in operation 901. At this point, the electronic device can store at least one image displayed on a display unit in at least one memory. For example, referring to FIG. 5, the electronic device 500 performs image processing on an image obtained through the first image sensor 530-1, through the image processing unit 600 of the processor 510 and stores it in the third block 820 of the first memory 520 by each frame unit. The electronic device 500 performs image processing on an image obtained through the Nth image sensor 530-N, through the external image processing unit 540-(N−1) and stores it in the first block 800 of the first memory 520 by each frame unit. At this point, the processor 510 can set a time stamp on an image inputted to the image processing unit 600 or an image outputted from the image processing unit 600, and can set a time stamp on an image provided from the external image processing unit 540-(N−1). As another example, referring to FIG. 5, the electronic device 500 performs image processing on an image obtained through the first image sensor 530-1, through the image processing unit 600 of the processor 510 and stores it in the first memory 520 by each frame unit. At this point, the processor 510 can set a time stamp in an image inputted to the image processing unit 600 or an image outputted from the image processing unit 600. The electronic device 500 can store an image obtained through the Nth image sensor 530-N in the second memory 550 by each frame unit before performing image processing through the image processing control unit 700 of the external image processing unit 540-(N−1). At this point, the external image processing unit 540-(N−1) can set a time stamp in an image stored in the second memory 550 by using the time setting unit 710. Here, an image stored in the memory 520 or 550 can include metadata having at least one of a frame identifier, a time stamp, focus information, and image setting information EXIF.

The electronic device can select a plurality of images for synthesis on the basis of a time stamp of images stored in a memory in operation 903. For example, if a capture event occurs, the electronic device 500 can select a first image whose time stamp is closest to a capture event occurrence time among images stored in the first block 800 of the first memory 520. Moreover, the electronic device 500 can select a second image whose time stamp is closest to a capture event occurrence time from among images stored in the third block 820 of the first memory 520. The electronic device 500 can synthesize a first image selected from the first memory 520 and a second image as one image. As another example, if a capture event occurs, the electronic device 500 can select a first image whose time stamp is closest to a capture event occurrence time from among images stored in the first memory 520. Additionally, the electronic device 500 can select a second image whose time stamp is closest to a capture event occurrence time from among images stored in the second memory 550. The electronic device 500 can synthesize a first image selected from the first memory 520 and a second image as one image.

Figure 12:
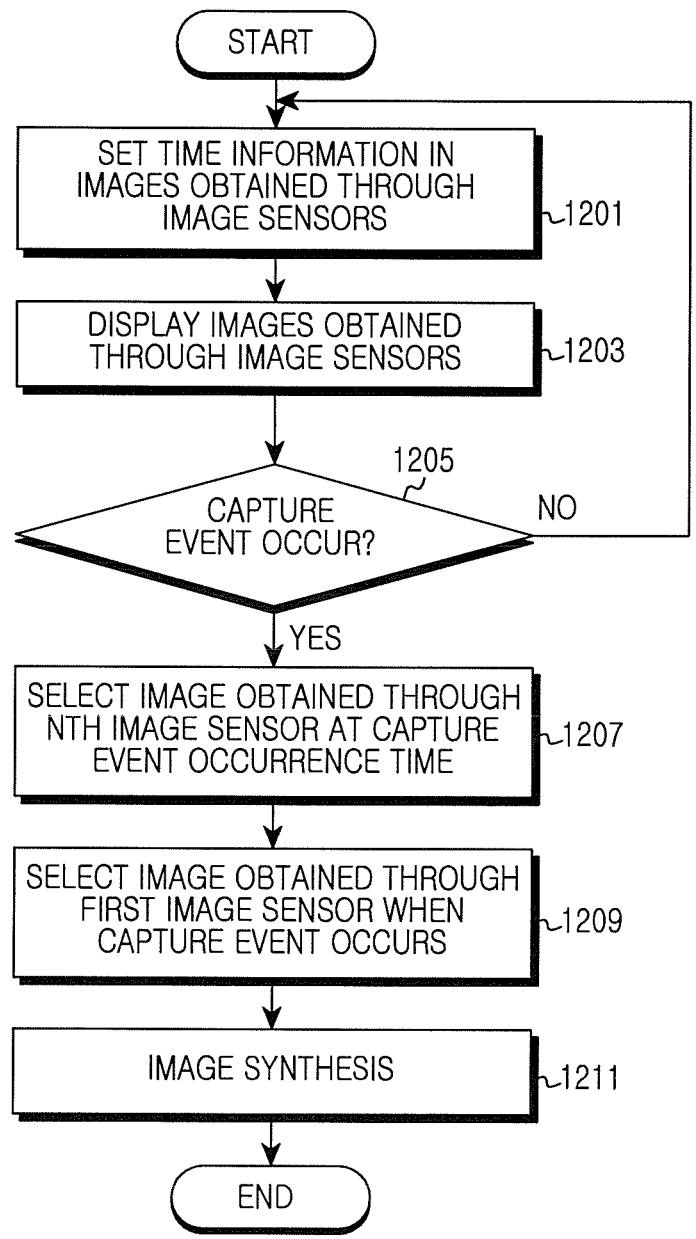
FIG. 12 is a flowchart illustrating a method of selecting images for synthesis in an electronic device according to various embodiments of the present disclosure.

An electronic device including a plurality of image sensors can have different processing delays on an image obtained through each image sensor by at least one difference in the number of pixels in each image sensor, the sensitivity of an Nth image sensor, the size of an image obtained through an Nth image sensor, or an image processing speed. Accordingly, the electronic device can synchronize images for synthesis as shown in FIG. 10 or 12.

Figure 10:
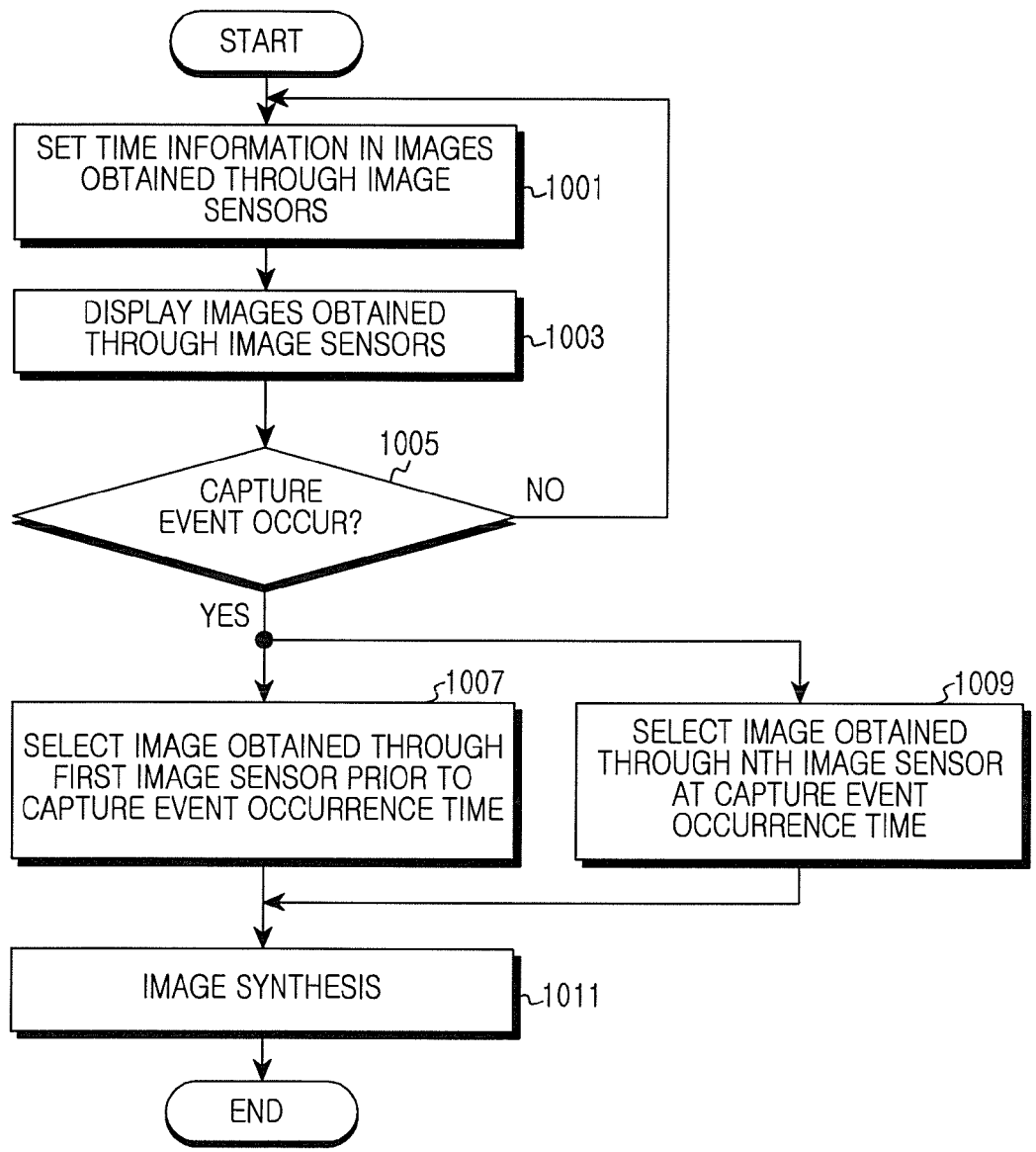
FIG. 10 is a flowchart illustrating a method of selecting images for synthesis in an electronic device according to various embodiments of the present disclosure.
Figure 11:
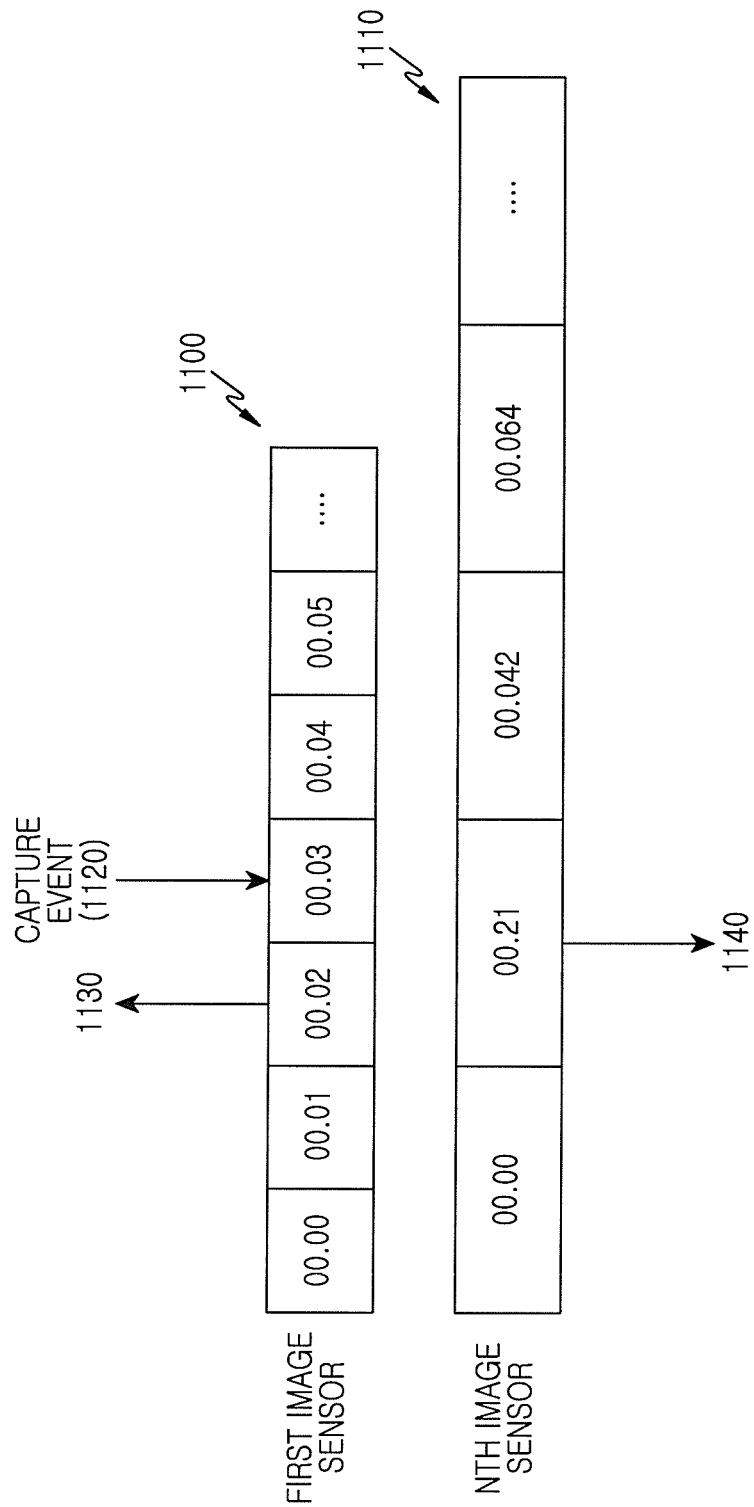
FIG. 11 is a view illustrating a configuration for selecting an image for synthesis according to various embodiments of the present disclosure.

FIG. 10 is a flowchart illustrating a method of selecting images for synthesis in an electronic device according to various embodiments of the present disclosure. Below, the flowchart for selecting an image for synthesis is described with reference to a memory configuration shown in FIG. 11. Hereinafter, it is assumed that the electronic device includes the low-pixel first image sensor 530-1 and the high-pixel Nth image sensor 530-N as shown in FIG. 5.

Referring to FIG. 10, the electronic device can set a time stamp on images obtained through a plurality of image sensors in operation 1001. For example, referring to FIG. 5, the processor 510 of the electronic device 500 can set a time stamp on an image inputted to the image processing unit 600 or an image outputted from the image processing unit 600, and can set a time stamp on an image provided from the external image processing unit 540-(N−1). At another example, referring to FIG. 5, the processor 510 of the electronic device 500 can set a time stamp on an image inputted to the image processing unit 600 or an image outputted from the image processing unit 600. Additionally, the external image processing unit 540-(N−1) of the electronic device 500 can set a time stamp on an image provided from the Nth image sensor 530-N by using the time setting unit 710.

The electronic device can display images obtained through image sensors on a display unit in operation 1003. At this point, the electronic device can store at least one image displayed on a display unit in at least one memory. For example, when a time stamp is set in an image inputted to the image processing unit 600 through the processor 510, the electronic device 500 can perform image processing on an image where a time stamp is set through the image processing unit 600 of the processor 510 and can store the image in the third block 820 of the first memory 520. As another example, when a time stamp is set in an image outputted from the image processing unit 600 through the processor 510, the electronic device 500 can store an image whose time stamp is set in the third block 820 of the first memory 520. As another example, when a time stamp is set in an image outputted from the external image processing unit 540-(N−1) through the processor 510, the electronic device 500 can store an image whose time stamp is set in the first block 800 of the first memory 520. As another example, when a time stamp is set in an image outputted from the external image processing unit 530-N through the time setting unit 710, the electronic device 500 can store an image whose time stamp is set in the second memory 550. At this point, referring to FIG. 11, the electronic device can store an image in the memory 520 or 550 by a frame unit. Here, an image stored in the memory 520 or 550 can include metadata having at least one of a frame identifier, a time stamp, focus information, and image setting information EXIF.

The electronic device can confirm whether a capture event occurs in operation 1005. For example, the electronic device can confirm whether a hardware button input corresponding to the capture event is detected. As another example, the electronic device can confirm whether an icon corresponding to the capture event is detected. As another example, the electronic device can confirm whether a user gesture corresponding to the capture event is detected.

If the capture event does not occur, the electronic device can set a time stamp on images obtained through a plurality of image sensors in operation 1001.

If the capture event occurs, the electronic device can select at least one image for synthesis including a time stamp prior closest to a capture event occurrence time from among images obtained through a first image sensor stored in a memory in operation 1007. For example, referring to FIG. 5, the electronic device 500 can select one first image 1130 including a time stamp prior closest to a capture event occurrence time 1120 as an image for synthesis from among images 1100 obtained through the first image sensor 530-1 and sequentially stored in the first memory 520. At this point, the electronic device 500 can select one first image 1130 from among images including a time stamp prior to the capture event occurrence time 1120 in consideration of a difference between a processing delay on an image obtained through the first image sensor 530-1 and a processing delay on an image obtained through the Nth image sensor 530-N.

Additionally, if the capture event occurs, the electronic device can select one image for synthesis including a time stamp closest to a capture event occurrence time from among images obtained through the Nth image sensor stored in a memory in operation 1009. For example, referring to FIG. 5, the electronic device 500 can select one second image 1140 including a time stamp closest to a capture event occurrence time 1120 as an image for synthesis from among images 1110 obtained through the Nth image sensor 530-N and sequentially stored in the first memory 520 or the second memory 550.

If images are selected for synthesis in operation 1007 and operation 1009, the electronic device can synthesize a first image selected from images provided from a first image sensor with a second image selected from images provided from an Nth image sensor as one image in operation 1011.

FIG. 12 is a flowchart illustrating a method of selecting images for synthesis in an electronic device according to various embodiments of the present disclosure. Below, the flowchart for selecting an image for synthesis is described with reference to a memory configuration shown in FIG. 13. Hereinafter, it is assumed that the electronic device includes the low-pixel first image sensor 530-1 and the high-pixel Nth image sensor 530-N as shown in FIG. 5.

Referring to FIG. 12, the electronic device can set a time stamp on images obtained through a plurality of image sensors in operation 1201. For example, referring to FIG. 5, the processor 510 of the electronic device 500 can set a time stamp on an image inputted to the image processing unit 600 or an image outputted from the image processing unit 600. Additionally, the external image processing unit 540-(N−1) of the electronic device 500 can set a time stamp on an image provided from the Nth image sensor 530-N by using the time setting unit 710.

Figure 13:
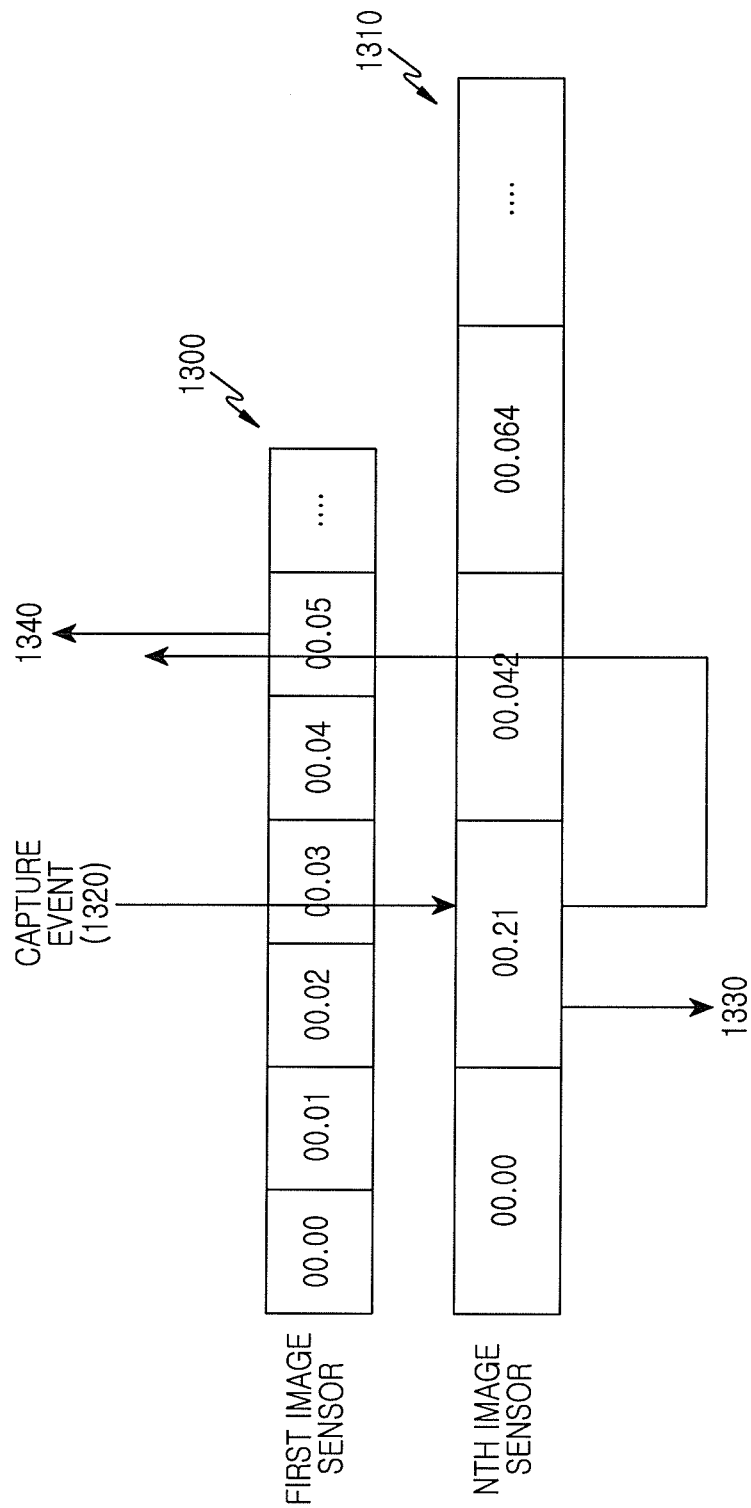
FIG. 13 is a view illustrating a configuration for selecting an image for synthesis according to various embodiments of the present disclosure.

The electronic device can display images obtained through image sensors on a display unit in operation 1203. At this point, the electronic device can store at least one image displayed on a display unit in at least one memory. For example, referring to FIG. 5, when a time stamp is set in an image inputted to the image processing unit 600 through the processor 510, the electronic device 500 can perform image processing on an image where a time stamp is set through the image processing unit 600 of the processor 510 and can store the image in the third block 820 of the first memory 520. As another example, referring to FIG. 5, when a time stamp is set in an image outputted from the image processing unit 600 through the processor 510, the electronic device 500 can store an image whose time stamp is set in the third block 820 of the first memory 520. As another example, referring to FIG. 7, when a time stamp is set in an image provided from the Nth image sensor 530-N through the time setting unit 710, the electronic device 500 can store an image whose time stamp is set in the second memory 550. At this point, as shown in FIG. 13, the electronic device can store an image in the memory 520 or 550 by a frame unit in operations 1300 and 1310. Here, an image stored in the memory 520 or 550 can include metadata having at least one of a frame identifier, a time stamp, focus information, and image setting information EXIF.

The electronic device can confirm whether a capture event occurs in operation 1205. For example, the electronic device can confirm whether a hardware button input corresponding to the capture event is detected. As another example, the electronic device can confirm whether an icon corresponding to the capture event is detected. As another example, the electronic device can confirm whether a user gesture corresponding to the capture event is detected.

If the capture event does not occur, the electronic device can set a time stamp on images obtained through a plurality of image sensors in operation 1201.

Additionally, if the capture event occurs, the electronic device can select one image for synthesis including a time stamp closest to a capture event occurrence time from among images obtained through the Nth image sensor stored in a memory in operation 1207. For example, referring to FIG. 5, the electronic device 500 can select one second image 1330 including a time stamp closest to a capture event occurrence time 1320 as an image for synthesis from among images 1310 obtained through the Nth image sensor 530-N and sequentially stored in the second memory 550.

The electronic device can select a second image for synthesis from among images obtained through the Nth image sensor and stored in a memory in order to synthesize one image including a time stamp closest to the processing time of a processor in operation 1209. For example, the electronic device 500 can select one first image 1340 including a time stamp closest to a time at which the second image selected from the external image processing unit 540-(N−1) starts to be transmitted to the processor 510 in order for synthesis in operation 1207. As another example, the electronic device 500 can select one first image 1340 including a time stamp closest to a time at which the second image selected from the external image processing unit 540-(N−1) starts to be stored in the first memory 520 through the processor 510 in order for synthesis in operation 1207.

If images are selected for synthesis, the electronic device can synthesize a first image selected from images provided from a first image sensor with a second image selected from images provided from an Nth image sensor as one image in operation 1211.

As mentioned above, the electronic device converts at least one image obtained through at least one sensor into a format displayable on a display unit through an image processing unit inside or outside a processor and then provides the converted image to the processor, so that a time delay due to an image processing time can be reduced.

By selecting a plurality of images for synthesis through a time stamp set in images obtained from image sensors, the acquisition times of images to be synthesized can be synchronized.

While the disclosure has been shown and described with reference to certain preferred embodiments thereof, it will be understood by those skilled in the art that various changes in form and details can be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. An electronic device comprising:
a first image sensor configured to generate a plurality of first image data;
a second image sensor configured to generate a plurality of second image data, wherein each second image data requires a longer process time than each first image data;
at least one processor is configured to:
in response to an occurrence of a capture event, select one of the plurality of second image data as a capture image; and
select one of the plurality of first image data as the capture image, the selected first image data with a process period within which the selected second image data is completely processed,
a display configured to display at least a portion of the selected first image data and second image data.

2. The electronic device of claim 1, wherein the at least one processor comprises:
a first processor comprising an application processor; and
a second processor comprising an image signal processor (ISP) distinguished from the application processor.

3. The electronic device of claim 2, wherein the application processor comprises an internal image signal processor.

4. The electronic device of claim 2, further comprising:
a first memory; and
a second memory logically or physically separated from the first memory,
wherein the first processor is configured to provide the first image data to the first memory; and
the second processor is configured to provide the second image data to the second memory.

5. The electronic device of claim 4, wherein the second processor is configured to provide the second image data to the first memory.

6. The electronic device of claim 5, wherein the first processor is configured to generate a synthesized image by using at least a portion of a time stamp of the first image data and a time stamp of the second image stored in the first memory.

7. The electronic device of claim 2, wherein the second processor is configured to convert the second image data received from the second image sensor into a format displayable on the display.

8. The electronic device of claim 1, wherein the first processor is configured to set a time stamp corresponding to the first image data and the second processor is configured to set a time stamp corresponding to the second data.

9. The electronic device of claim 1, wherein the second image has a larger data size than the first image.

10. An electronic device comprising:
a storage device configured to store a plurality of first image data, each first image having a respective first time stamp and a plurality of second images, each second image having a respective second time stamp, wherein each first image data requires a longer process time than each second image data;
an application processor configured to process the plurality of first image data and provide the processed plurality of first image data to the storage device;
an image signal processor (ISP) configured to process the plurality of second image data and provide the processed plurality of second image data to the storage device, wherein the ISP is distinguishable from the application processor; and
a display configured to display at least one image of the plurality of first image data processed by the application processor and the at least one second image data processed by the image signal processor,
wherein the application processor is configured to select one of the plurality of first image data stored in the storage device in response to an occurrence of a capture event,
wherein the image signal processor is configured to select one of the plurality of second image data in response to an occurrence of a capture event, the selected second image data with a process period within which the selected first image data is completely processed,
wherein the display is configured to display at least a portion of the selected first image data and second image data.

11. The electronic device of claim 10, wherein the application processor comprises an internal image signal processor.

12. The electronic device of claim 10, wherein the application processor is configured to generate a synthesized image by using at least a portion of the time stamp of the first image data and the time stamp of the second image stored in the storage device.

13. The electronic device of claim 10, wherein
the application processor is configured to set a time stamp corresponding to the first image data provided from a first image sensor; and
the image signal processor is configured to set a time stamp corresponding to the second image data provided from a second image sensor disposed outside the electronic device.

14. The electronic device of claim 10, wherein the image signal processor is configured to convert the second image data into a format displayable on the display.

15. An operating method of an electronic device having a plurality of image sensors, a processor and an image signal processor corresponding to the plurality of image sensors, the method comprising:
storing a plurality of first image data, each first image including a respective first time stamp added by the processor and a plurality of second image data, each second image including a respective second time stamp added by the image signal processor, wherein the second image data requires a longer process time than the first image data;
in response to an occurrence of a capture event, selecting one of the plurality of second image data as a capture image;
selecting one of the plurality of first image data as the capture image, the selected first image data with a process period within which the selected second image is completely processed, and
displaying at least a portion of the selected first image data and second image data.

16. The method of claim 15, wherein storing the data comprises:
storing the plurality of first image data in a first memory; and
storing the plurality of first image data in a second memory, wherein the second memory is logically or physically separated from the first memory.

* * * * *